Oct. 29, 1968     A. GRANT ET AL     3,407,530
SECTIONALLY FORMED TOY WITH IDENTIFYING
INDICIA ON THE SECTIONS
Filed Feb. 18, 1966
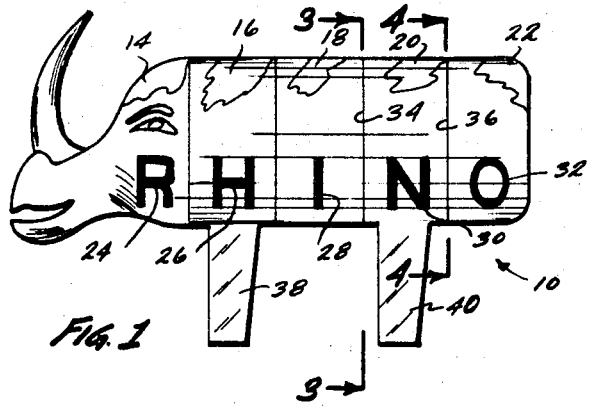
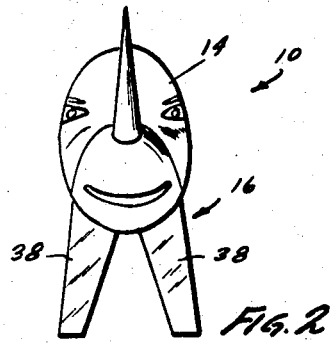
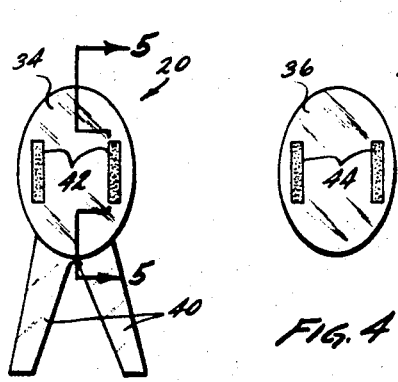
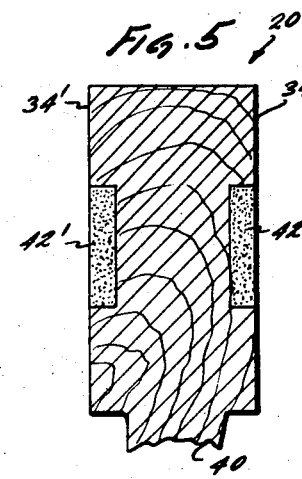
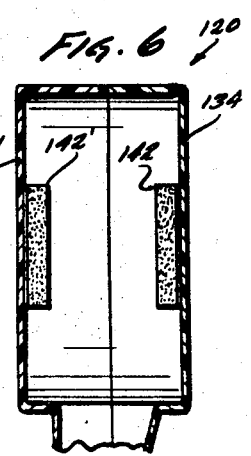
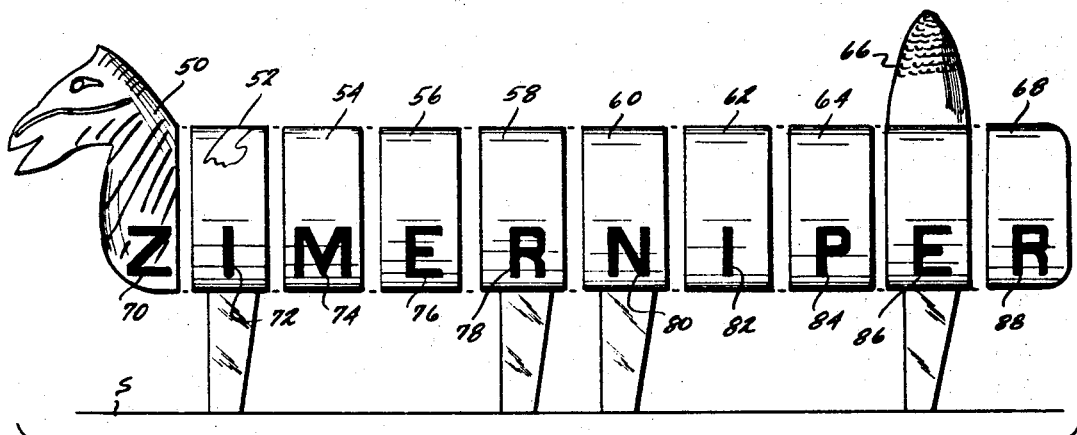
INVENTORS
ALLAN GRANT
LEO MONAHAN
ATTORNEYS

United States Patent Office 3,407,530
Patented Oct. 29, 1968

3,407,530
SECTIONALLY FORMED TOY WITH IDENTIFYING INDICIA ON THE SECTIONS
Allan Grant, 808 Lockearn, Bel Air, Calif. 90049, and
Leo Monahan, 14549 La Maida St., Sherman Oaks, Calif. 91403
Filed Feb. 18, 1966, Ser. No. 528,553
9 Claims. (Cl. 46—22)

ABSTRACT OF THE DISCLOSURE

The invention is an educational toy comprising a group of parts which can be assembled and held together to form a complete identifiable figure. Each part has indicia on it so that when the parts are properly assembled into the figure the indicia will be arranged in proper sequence related to the figure and identifying word and thereby serving an educational purpose, the word being identifiable with the figure formed.

---

The present invention relates generally to an educational toy having a plurality of removably securable, figure-forming parts and, more specifically, pertains to such a toy wherein the parts are so shaped as to be assembled into actual or grotesque figures of various sizes and shapes, and wherein the parts are provided with predetermined indicia thereon corresponding to their shapes, so that when the parts are properly assembled into actual figures, the indicia will be disposed in proper sequences related to the figures, thereby serving an educational purpose.

While there have been many toys, used in the past and disclosed in the prior art, that have embodied a plurality of parts that could be assembled in various ways to form human or animal figures, many of these toys have not proven highly popular or successful for one or more of the following reasons:

(A) They have been complicated in construction and thus expensive to manufacture and purchase;

(B) They have lacked versatility in that they have either included a limited number of parts, or have included parts which could be assembled into only a single figure or a limited number of figures, thereby failing to hold the interest of a child playing with them;

(C) The parts of the toys have been so constructed as to be difficult to assemble and/or disassemble;

(D) The parts of the toys have not been interchangeable, i.e., if a part were lost, a complete figure could not be assembled, thereby resulting in a less desirable toy;

(E) The partially and/or finally assembled figures formed by the parts of some toys have been unstable, thereby frustrating a child in his or her efforts to assemble a complete figure; and (F) Substantially all of the prior toys of this general type have been lacking in further educational value to children once they have learned to assemble the parts and have become familiar with the appearance of the animal or human forms into which the parts could be assembled.

The new and improved toy of the present invention possesses substantially all of the advantages of prior toys of the same general type, and is not subject to any of the disadvantages described above. In addition, the toy of this invention possesses educational value which is far in excess of any similarly employed prior art toys.

It is an object of the present invention, therefore, to provide a new and improved toy of the type comprising a plurality of parts that may be assembled to form one or more predetermined figures.

Another object is the provision of a new and improved toy of the type wherein a plurality of parts may be easily assembled in various ways to form various types of figures simulating actual or grotesque animal or human forms.

An additional object is the provision of a toy of the type comprising a plurality of parts which may be removably assembled to form a plurality of different animal or human figures, which toy is so constructed and arranged as to possess versatility, a great appeal to children, and educational value in excess of that provided by similarly employed toys.

Still another object is to provide such a figure-forming parts toy wherein the parts are readily interchangeable and are easily assembled as to enable the formation of a large number of figures simulating both actual and grotesque forms of animals or the like.

A still further object is the provision of such a figure-forming parts toy wherein the parts are so formed as to enable the assembling of self-supporting and stable figures simulating actual or grotesque, animal or human forms of various sizes and shapes.

Yet another object is to provide such a figure-forming parts toy wherein the parts are provided with indicia that are related to the shape of the parts, whereby the proper assembling of the parts to simulate an actual animal or human figure results in the indicia on the parts being positioned in a proper predetermined manner, thereby serving to further educate the child and adding to both the educational and appeal value of the toy.

An additional object is the provision of such a figure-forming parts toy, wherein the indicia on the parts represent letters of the alphabet to enable the proper spelling of the names of assembled figures, when the parts are assembled in a proper predetermined relation to simulate actual figures.

A further object is to provide a toy comprising a plurality of parts which may be assembled to form various figures, the parts being simple in construction, easy to manufacture, durable, easy to assemble and disassemble, and readily interchangeable.

According to a preferred form of the present invention, the toy comprises a plurality of parts of predetermined shapes, which simulate portions of various animals. The parts are so constructed as to be easily assembled and disassembled by providing, for example, magnetic means mounted on or within each of the parts, which enables them to be magnetically associated. Each of the parts is provided with a letter of the alphabet on its outer surface which is related to the shape of the part, so that when a plurality of parts are assembled to form an actual animal, the letters will spell the name of the animal, thereby teaching a child playing with the toy both the proper appearance and spelling of a respective animal. By providing a large number of these parts which can be readily interchanged, a child may form a very large number of both actual and grotesque animal forms in various sizes and shapes and with various spellings, thereby adding to the interest-sustaining value of the toy.

The present invention, both as to its organization and manner of operation, together with further objects and advantages thereof, may best be understood by reference to the following description, taken in connection with the accompanying drawing in which like reference characters refer to like elements in the several views.

In the drawings:

FIGURE 1 is a side elevational view of a figure-forming toy, with the parts in assembled relation, which is constructed according to the principles of the present invention;

FIGURE 2 is a front elevational view of the toy shown in FIGURE 1;

FIGURE 3 is a front elevational view of one of the intermediate figure parts of the type having legs, taken substantially along line 3—3 of FIGURE 1;

FIGURE 4 is a view similar to FIGURE 3, showing one of the end figure parts without legs, taken substantially along line 4—4 of FIGURE 1;

FIGURE 5 is an enlarged sectional view taken substantially along line 5—5 of FIGURE 3, showing the construction of one of the figure parts and the magnetic securing means therefor;

FIGURE 6 is a view similar to FIGURE 5, showing a modified form of construction for the figure parts; and FIGURE 7 is a side elevational view showing a plurality of figure parts, constructed in accordance with the principles of the instant invention, disposed in aligned and separated relation, the parts forming one of the many varieties of grotesque figures that may be assembled by the use of the figure-forming toy of this invention.

As a preferred or exemplary embodiment of the present invention, FIGURES 1 and 2 illustrate a figure toy 10 comprising a plurality of distinct parts 14, 16, 18, 20 and 22, which are so shaped and assembled as to simulate an animal figure such as a rhinoceros. The parts 14 through 22 are disposed in abutting relation and are removably secured together in a manner to be specifically described hereinafter. Predetermined indicia, such as letters of the alphabet 24 through 32, are provided on the outer surface of the parts 14 through 22, respectively, to spell the name of the animal when the parts have been properly assembled to simulate an actual animal, such as "RHINO" shown in FIGURE 1.

Referring to FIGURES 1 through 4, each of the parts 14 through 22 is generally oval-shaped and is provided with at least one flat face or surface which is adapted to be secured to and to abut a similar surface on an adjacent part in such a manner that the surfaces are disposed in substantially parallel relation when the parts are assembled. For example, the intermediate parts, such as the part 20, are provided with substantially parallel and flat faces 34 on opposite sides thereof (see FIGURE 3), and the end parts, such as the part 22, are provided with a single substantially flat face 36 disposed on the inner side thereof (see FIGURE 4). Some of the intermediate parts, such as 16 and 20, are provided with pairs of depending legs 38 and 40, respectively, which preferably comprise substantially flat lower end portions for the purpose of supporting the parts and an assembled toy in a substantially stable manner, as shown in FIGURES 1 and 2.

The flat faces of the parts 14 through 22 may be abutted and secured together to form a figure, such as that shown in FIGURE 1, in any suitable or conventional manner, but preferably are secured by magnetic means in the form of pairs of magnets mounted on each of the parts adjacent to and substantially flush with their flat faces, such as the pair of magnets 42 mounted on the part 20 adjacent the flat face 34 thereof (see FIGURE 3) and the pair of magnets 44 mounted on the end part 22 adjacent the flat face 36 thereof (see FIGURE 4). The pairs of magnets for the parts 14 through 22 preferably are equally laterally spaced and are disposed in the same relative positions on each of the parts, so that the magnets will be disposed in aligned and abutting relation when the parts are assembled in the manner shown in FIGURE 1, thereby serving to maintain the parts in this assembled relation.

The magnets of each pair may be of any suitable type or construction, and preferably are of a predetermined polarity so that they will only attract a pair of magnets on an adjacent part when the adjoining parts are disposed in a predetermined angular relation. For example, the pairs of magnets 42 and 44 of the intermediate part 34 and end part 36, respectively, would only attract when these parts were disposed in the relative positions shown in FIGURE 1, wherein the legs 40 of the intermediate part 20 extend downwardly for supporting the assembled animal 10. If the part 20 were positioned so that the legs 40 extended upwardly, the adjacent pairs of magnets 42 and 44 would repel and prevent the assembling of the parts in this manner. It is noted, however, that the present invention is not limited to the feature of providing pairs of magnets with a predetermined polarity such that adjacent parts can only be assembled when they are in a predetermined angular relation relative to each other. Alternatively, the magnets on the parts 14 through 22 could be so formed as to attract magnets or steel members mounted on adjacent parts regardless of the orientation of the parts, without departing from the spirit or scope of the present invention.

In accordance with one embodiment of this invention, the parts are substantially solid in construction and are formed of a suitable material such as wood or plastic. As an illustrative example, FIGURE 5 illustrates the pairs of magnets 42 and 42' adjacent the opposite and parallel flat faces 34 and 34', respectively, of the part 20 as being embedded within the part and secured thereto in any suitable manner, so that the magnets 42 and 42' are flush with the surfaces 34 and 34'. In this manner, the parts can be secured to assemble a figure, such as that shown in FIGURE 1, with the magnets thereof being hidden within the assembled figure, thereby not detracting from the appearance of the figure and enabling it to create a unitary impression.

An alternate form of construction for the parts 14 through 22 is disclosed in FIGURE 6, wherein, as an illustrative example, the intermediate part 120 is disclosed as being hollow and formed or molded of a suitable plastic material, such as polyethylene. In this modified construction, the pairs of magnets 142 and 142' are adhesively or otherwise secured in any suitable manner to the interior surface of the flat faces 134 and 134', respectively. The modified part 120 possesses the advantage of completely hiding the securing magnets 142 and 142' thereof, even when the parts are disposed in separated relation. It is obvious that, in this modified construction, the magnets 142 and 142' are of a strength which is sufficient to attract magnets or steel members on adjacent parts through the thicknesses of the adjacent and abutted sidewalls of the parts.

It is noted that other types of securing means, whether magnetic or non-magnetic, may be utilized for assembling the parts of the instant toy, without departing from the scope of this invention. The utilization of pairs of laterally spaced magnets, however, is advantageous in that the adjacent assembled parts are effectively prevented from inadvertent relative rotation by the provision of magnets adjacent both sides thereof.

It is apparent from the foregoing description that if the parts 14 through 22 were assembled in a manner other than that shown in FIGURE 1, so as to simulate a grotesque or unusual form of animal, the letters 24 through 32 would not spell "RHINO," but instead would be disposed in a sequence wherein they would spell an unusual or ungrammatical word, depending on the orientation of the parts. Only when the parts are properly orientated to form an actual animal or other figure, therefore, will the letters on the parts properly spell the name of that figure, thereby serving to teach a child playing with the toy names and spelling of properly formed animals, in addition to the appearance thereof. The provision of such letters or other indicia on the parts of the instant figure toy 10 not only adds to the educational value of the toy, but serves to greatly improve the interest-sustaining value of such a toy.

Referring to FIGURE 7, it will be seen that, through the use of figure parts having the construction of the parts 14 through 22 disclosed herein, various forms of animals or other figures, both actual and grotesque, could be assembled by providing a large number of parts which are shaped to simulate portions of various types of animals or other figures. By providing parts 50 through 68 with substantially flat and parallel-engaging faces, as described above, many forms of grotesque animals could be assembled having different shapes and sizes. When all of these parts are provided with letters of the alphabet 70 through 88 on the outer surfaces thereof, as shown in FIGURE 7, strange animals may be formed of a length which may be virtually endless. By the use of an adequate number of parts having legs (e.g. parts 52, 58, 60 and 66), the various sections of the assembled animal will be adequately supported relative to support surfaces. In addition by orienting these parts in a manner such that the letters on their exterior portions are disposed in a pronounceable sequence, various names may be originated for these strange animals, such as "ZIMERNIPER" shown in FIGURE 7. The construction of the instant figure-forming parts, therefore, makes it possible for a child to assemble a predetermined number of actual figures and a virtually endless number of unusual or grotesque ones, and to simultaneously form the proper names of the actual figures and originate new and unusual names for the grotesque ones.

It is noted that within the scope of the instant invention, indicia other than the letters of the alphabet may be provided on the exterior of the parts of the figure toy 10. For example, entire words could be provided on the outer surfaces of the parts, so that when the latter were assembled in a proper relation to simulate the appearance of an actual animal or other figure, the words would form a grammatical sentence relating to the animal or other figure, or to a related subject. Additionally, the parts could have numbers and arithmetic signs on the outer surfaces thereof which, when the parts were properly assembled to simulate the appearance of an actual animal or other figure, would be disposed in a proper sequence to, for example, properly add or subtract the numbers, or to illustrate the solution to other types of arithmetic problems. Obviously, many other variations of indicia may be provided on the exterior of the parts in order to enhance the educational value of such a figure-forming toy, in accordance with the teachings of this invention.

From the foregoing description, it is apparent that the instant figure toy 10 may comprise any suitable number of parts having predetermined indicia thereon such that they will be arranged in a predetermined sequence when the parts are assembled in a predetermined manner. It will be appreciated that the parts of the instant toy are simple in construction; very easy to assemble and disassemble; capable of forming any type of figure of almost unlimited length, which will be stable and self-supporting relative to a support surface; and are extremely versatile owing to the almost endless number of interchangeable ways such parts could be assembled to dispose the indicia thereon in various sequences. The instant toy, therefore, possesses a great appeal and educational value to a child playing with it, by teaching the child the proper spelling of actual animals or other figures formed with the parts, and also enabling the child to invent new pronounceable or unusual names for strange or grotesque animals assembled with the parts. It is further apparent that the parts of the instant figure toy 10 could be shaped to simulate various forms of animal, human or other figures or combinations of both, and the specific disclosure of animal forms herein is not intended to limit the present invention in any manner whatsoever. As a further specific modification, the flat faces of some of the parts could be disposed in angular, rather than parallel relation to enable the formation of animals or other figures having curved configurations.

It is thought that the invention and many of its attendant advantages will be understood from the foregoing description, and it will be apparent that various changes may be made in the form, construction and arrangement of parts, without departing from the spirit or scope of the invention or sacrificing all of its material advantages, the forms hereinbefore described being merely preferred embodiments thereof.

What is claimed is:

1. A toy comprising, a plurality of separate parts, said parts having a shape and exterior contour to simulate a portion of a complete predetermined figure, each of the parts embodying means for enabling the parts to be assembled and held in a predetermined relationship to simulate said complete predetermined figure, said parts having such shapes and contours that at least some of them can be assembled and held together in a relationship which is other than said predetermined relation, the correctness of the relationship being determinable only from the resulting shape, the parts having predetermined indicia thereon which are exposed when the parts are assembled, said indicia having relation to the parts such that when the parts are assembled in said predetermined relation to correctly simulate the actual physical shape and exterior contour of said figure the indicia appear in a predetermined sequence effecting an identification of the figure that is formed by the parts.

2. The toy of claim 1 wherein said parts are shaped to simulate portions of various animals figures.

3. The toy of claim 1 wherein said predetermined indicia comprise letters of the alphabet, whereby when said parts are assembled in said predetermined relation, said letters are disposed in a sequence to properly spell the name of said assembled figure.

4. The toy of claim 1 wherein said securing means comprise magnetic members mounted on and adjacent to the engaging surfaces of said parts.

5. The toy of claim 1 wherein said plurality of parts includes end parts having a substantially flat face on one side thereof, and intermediate parts having substantially flat faces on opposite sides thereof, some of said intermediate parts having supporting members extending therefrom for supporting an assembled figure, said parts being disposed in assembled relation with said faces in abutting and substantially parallel relation.

6. The toy of claim 5 wherein said securing means comprises a magnet mounted on each of said parts and disposed adjacent to and substantially flush with one of the flat faces thereof.

7. The toy of claim 5 wherein pairs of laterally spaced magnets are mounted on said parts adjacent to and substantially flush with each of said flat faces, each pair of said magnets having a predetermined polarity so as to attract an adjacent pair of magnets only when the adjacent parts are disposed in a preselected relation.

8. The toy of claim 5 wherein said parts are formed of wood and have said magnets embedded therein.

9. The toy of claim 5 wherein said parts are hollow and are formed of a plastic material, and wherein said magnets are secured to the inner surfaces of said flat faces.

References Cited

UNITED STATES PATENTS

| 2,510,884 | 6/1950 | Greene | 273—157 X |
| 2,725,234 | 11/1955 | Coble et al. | 46—22 X |
| 3,018,583 | 1/1962 | Novotney | 46—22 X |
| 3,095,668 | 7/1963 | Dorsett | 46—25 |

FOREIGN PATENTS 965,399  7/1964  Great Britain.

LOUIS G. MANCENE, *Primary Examiner.*

R. F. CUTTING, *Assistant Examiner.*